United States Patent [19]

Hishinuma

[11] Patent Number: 4,899,049
[45] Date of Patent: Feb. 6, 1990

[54] RADIATION IMAGE READ-OUT APPARATUS

[75] Inventor: Kazuhiro Hishinuma, Kaisei, Japan

[73] Assignee: Fuji Photo Film Co., Ltd., Kanagawa, Japan

[21] Appl. No.: 920,219

[22] Filed: Oct. 17, 1986

[30] Foreign Application Priority Data

Oct. 18, 1985 [JP] Japan ............................ 60-232509

[51] Int. Cl.$^4$ ................................................. G03C 5/16
[52] U.S. Cl. ............................... 250/327.2; 250/484.1
[58] Field of Search ........... 250/327.2, 484.1, 327.2 B, 250/327.2 C, 327.2 D, 327.2 G, 484.1 B; 364/414

[56] References Cited

U.S. PATENT DOCUMENTS

4,620,097  10/1986  Tanaka et al. .................. 250/327.2
4,728,791  3/1988   Goto ............................... 250/327.2

Primary Examiner—Carolyn E. Fields
Assistant Examiner—Richard Hanig
Attorney, Agent, or Firm—Gerald J. Ferguson, Jr.

[57] ABSTRACT

A radiation image read-out apparatus comprises a system for emitting stimulating rays to a stimulable phosphor sheet carrying a radiation image of an object stored thereon by exposure to a radiation passing through the object, a photodetector for detecting light emitted by the stimulable phosphor sheet when it is exposed to stimulating rays, an amplifier for amplifying a read-out image signal generated by the photodectector, and A/D converter for digitizing the output of the amplifier, and a predictor for predicting the scattered radiation amount stored on the stimulable phosphor sheet. An operation circuit is positioned between the amplifier and the photodetector for subtracting a signal component representing the scattered radiation amount from the read-out image signal on the basis of the scattered radiation amount predicted by the scattered radiation amount predictor. An expander is positioned between the operation circuit and the amplifier for adjusting an image signal generated by the operation circuit to a predetermined level.

4 Claims, 6 Drawing Sheets

RADIATION IMAGE READ-OUT APPARATUS

BACKGROUND OF THE INVENTION

1. Field of the Invention

This invention relates to a radiation image read-out apparatus for exposing a stimulable phosphor sheet carrying a radiation image of an object stored thereon to stimulating rays which cause it to emit light in proportion to the stored radiation energy, and photoelectrically detecting the emitted light to obtain an image signal for use in reproduction of a visible radiation image. This invention particularly relates to a radiation image read-out apparatus which prevents the contrast of the reproduced visible image from decreasing due to scattered radiation.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264 and 4,346,295 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored thereon, and is then scanned with stimulating rays such as a laser beam which cause the stimulable phosphor sheet to emit light in proportion to the stored radiation energy. The light emitted by the stimulable phosphor sheet when it is exposed to stimulating rays is photoelectrically detected and converted into an electric image signal, which is processed as desired to reproduce a visible image on a recording medium such as a photographic film or on a display device such as a cathode ray tube (CRT).

The radiation image recording and reproducing system using a stimulable phosphor sheet is advantageous over conventional radiography in that the image can be recorded over a very wide range (latitude) of radiation exposure and further in that the electric signal used for reproducing the visible image can be freely processed to improve the image quality for viewing, particularly for diagnostic purposes. More specifically, since the amount of light emitted upon stimulation after the radiation energy is stored on the stimulable phosphor sheet varies over a wide range in proportion to the amount of said stored energy, it is possible to obtain an image having desirable density regardless of the amount of exposure of the stimulable phosphor sheet to the radiation, by reading out the emitted light with an appropriate read-out gain and converting it into an electric signal to reproduce a visible image on a recording medium or a display device. The electric signal may further be processed as desired to obtain a radiation image suitable for viewing, particularly for diagnostic purposes. This is very advantageous in practical use.

However, when an object is exposed to a radiation for recording a radiation image in the aforesaid radiation image recording and reproducing system, radiation scattering (Compton scattering and Thomson scattering) is caused by elastic collision and electromagnetic interaction between the radiation and the object substance. The scattered radiation thus generated advances three-dimensionally in random directions, and impinges also upon the stimulable phosphor sheet. When the stimulable phosphor sheet is exposed to the scattered radiation besides the main transmitted radiation which carries the radiation image of the object and to which the stimulable phosphor sheet should be exposed for image recording, the contrast of the radiation image recorded by the main transmitted radiation on the stimulable phosphor sheet becomes low.

Figure 2A:
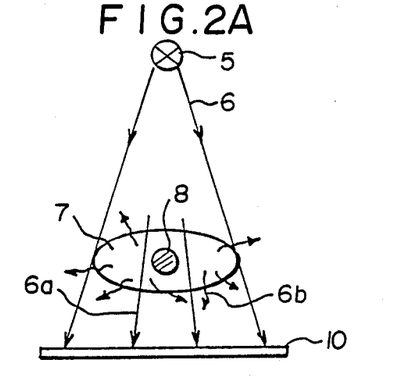
FIG. 2A is a schematic view showing the condition of radiation image recording on the stimulable phosphor sheet.
Figure 2B:
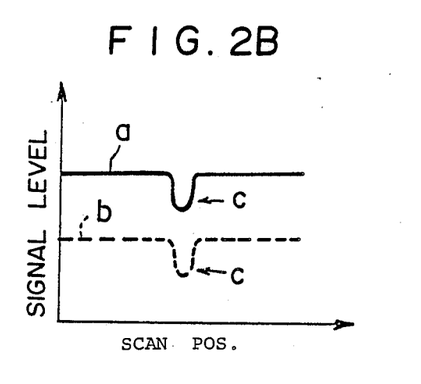
FIGS. 2B and 2C are explanatory views showing decrease in contrast of the radiation image.
Figure 2C:
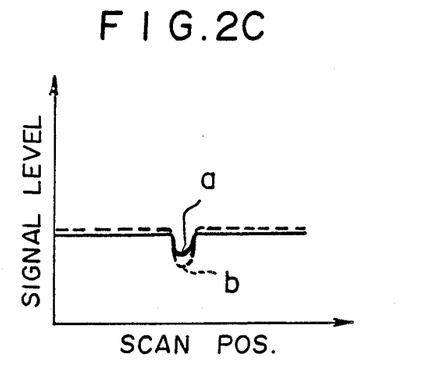

FIG. 2A is a schematic view showing the condition of radiation image recording on the stimulable phosphor sheet. Specifically, as shown in FIG. 2A, a stimulable phosphor sheet 10 is exposed to a radiation 6 emitted by a radiation source 5 constituted by an X-ray tube or the like and passing through an object 7 to have a radiation image of the object 7 stored on the sheet 10. At this time, a portion 8 exhibiting high radiation absorptivity and present inside of the object 7 is recorded as a "shadow" portion on the stimulable phosphor sheet 10. Thus the read-out image signal detected at one scanning line on the stimulable phosphor sheet 10 and representing the level of the radiation energy stored on the sheet 10 becomes as indicated by "a" in FIG. 2B, and a portion "c" at which the level of the signal "a" is markedly low corresponds to the object portion 8 exhibiting high radiation absorptivity. However, the read-out image signal "a" also carries the energy of a scattered radiation 6b in addition to the main transmitted radiation 6a shown in FIG. 2A. In the case where image recording is conducted on the stimulable phosphor sheet 10 so that the scattered radiation 6b is not generated, the read-out image signal detected from the stimulable phosphor sheet 10 becomes as indicated by "b" in FIG. 2B. Since, in general, the distribution of the scattered radiation 6b is approximately uniform as described later, it is assumed herein that the distribution is completely uniform. Namely, the read-out image signal "a" is in the form wherein a signal component Ss representing the energy level of the scattered radiation 6b is superposed on a signal component Sp representing the energy level of the main transmitted radiation 6a. However, since the read-out gain of a photodetector is usually controlled so that the background portion of the radiation image becomes of a predetermined level, the signal level difference is compressed and the contrast becomes low in the read-out image signal "a" as compared with the read-out image signal "b" as shown in FIG. 2C.

Accordingly, various attempts have heretofore been made to eliminate the adverse effect of the scattered radiation. For example, it has been proposed to dispose a grid for absorbing the scattered radiation between the object and the stimulable phosphor sheet. The grid comprises lead plates having a thickness of, for example, 1 mm or less and combined in a grid form or a multiple row form. When the grid is disposed as mentioned above, the scattered radiation advancing in random directions is absorbed by the lead plates. However, in the case of radiation image recording of the human body, even when such a grid is used, the amount of the scattered radiation is considerably large and is approximately equal to the amount of the main transmitted radiation, and therefore it is not possible to eliminate the scattered radiation completely with the grid.

It has also been proposed to position a first slit plate and a second slit plate respectively between the radiation source such as the X-ray tube and the object, and between the object and the stimulable phosphor sheet, to emit a radiation in a fan beam form, and to move the radiation source and the slit plates in synchronization with each other, thereby scanning the object with the radiation in the fan beam form. In this case, the radiation scattered by the object is intercepted by the second slit plate and does not impinge upon the stimulable phosphor sheet. However, with this method, since it takes approximately two to five seconds for radiation image recording and the object readily moves due to body motion or the like during this time, a motion artifact readily arises in the recorded image.

It has also been proposed to conduct signal processing for eliminating the adverse effect of the scattered radiation on the read-out image signal obtained by photoelectrically detecting the light emitted by the stimulable phosphor sheet, thereby restoring the contrast of the reproduced visible image. However, with this method, since the signal processing is conducted after digitizing the read-out image signal, the signal representing fine contrast of the radiation image is affected by quantization errors, and the fine contrast cannot be expressed on the reproduced visible image.

SUMMARY OF THE INVENTION

The primary object of the present invention is to provide a radiation image read-out apparatus which eliminates the adverse effect of scattered radiation without generating various drawbacks of the conventional techniques.

Another object of the present invention is to provide a radiation image read-out apparatus which provides a visible radiation image of high contrast.

The present invention provides a radiation image read-out apparatus comprising:

(i) a stimulating ray emission means for emitting stimulating rays to a stimulable phosphor sheet carrying a radiation image of an object stored thereon by exposure to a radiation passing through said object, (ii) a photodetector for photoelectrically detecting light emitted by said stimulable phosphor sheet in proportion to the stored radiation energy when said stimulable phosphor sheet is exposed to said stimulating rays, (iii) an amplifier for amplifying a read-out image signal generated by said photodetector, (iv) an A/D converter for digitizing an output of said amplifier, (v) a scattered radiation amount predictor for predicting a scattered radiation amount stored on said stimulable phosphor sheet, (vi) an operation circuit positioned between said amplifier and said photodetector for subtracting a signal component representing said scattered radiation amount from said read-out image signal on the basis of said scattered radiation amount predicted by said scattered radiation amount predictor, and (vii) an expander positioned between said operation circuit and said amplifier for adjusting an image signal generated by said operation circuit to a predetermined level.

With the radiation image read-out apparatus in accordance with the present invention, since the signal component of scattered radiation is eliminated from the read-out image signal before the read-out image signal is passed through the expander and the A/D converter, the signal representing fine contrast of the radiation image is not lost. Therefore, it becomes possible to reproduce a visible radiation image with high contrast.

DESCRIPTION OF THE PREFERRED EMBODIMENTS

The present invention will hereinbelow be described in further detail with reference to the accompanying drawings.

Figure 1:
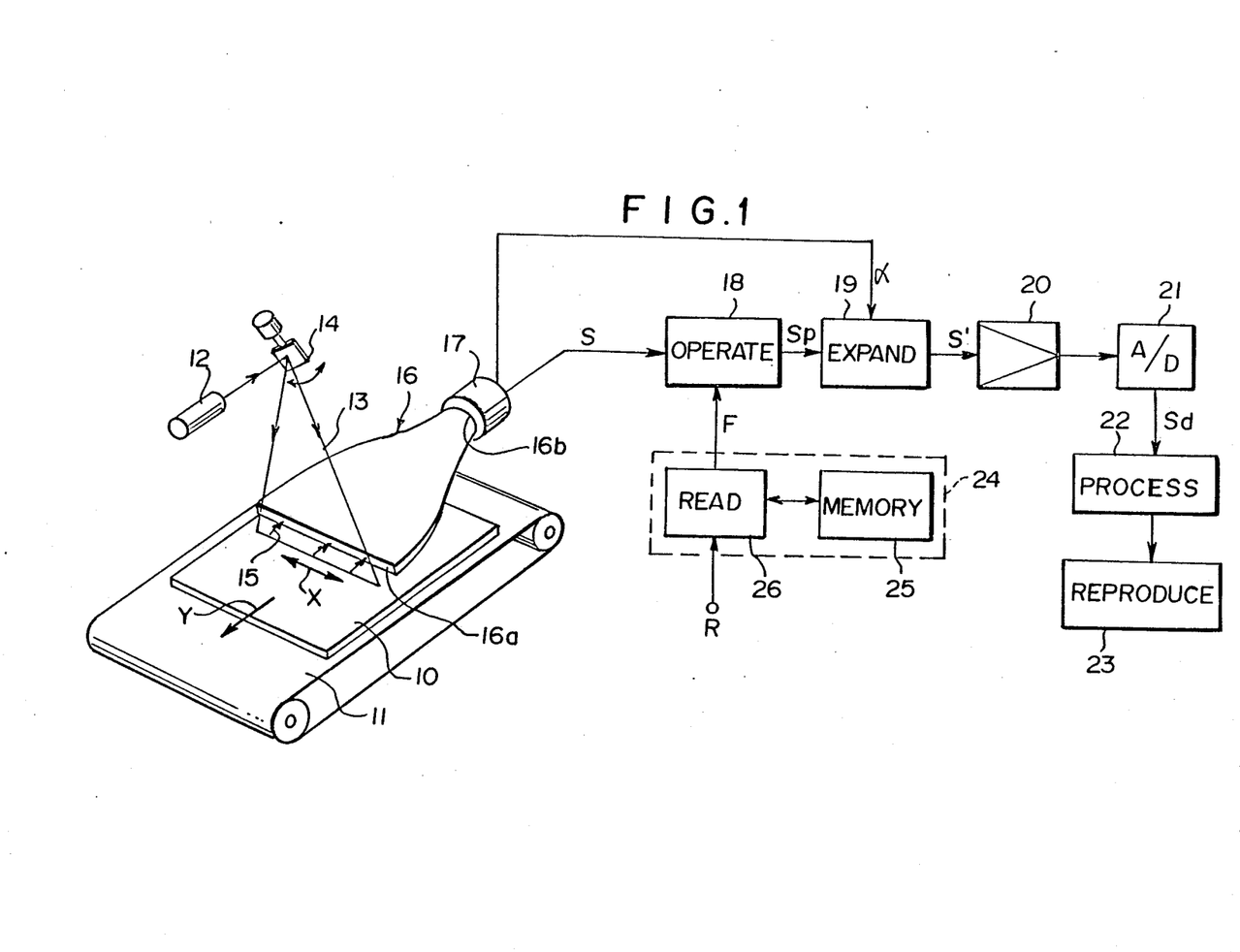
FIG. 1 is a schematic view showing an embodiment of the radiation image read-out apparatus in accordance with the present invention.

Referring to FIG. 1, a stimulable phosphor sheet 10 carrying a radiation image of an object 7 such as the human body stored thereon by exposure to a radiation such as X-rays passing through the object 7 as shown in FIG. 2A is conveyed in a sub-scanning direction as indicated by the arrow Y by a sheet conveyance means 11 constituted by an endless belt device or the like. A laser beam 13 emitted as stimulating rays by a laser beam source 12 is deflected by a light deflector 14 constituted by a galvanometer mirror or the like, and is made to scan the stimulable phosphor sheet 10 in a main scanning direction as indicated by the arrow X approximately normal to the sub-scanning direction. The portion of the stimulable phosphor sheet 10 exposed to the laser beam 13 emits light 15 in an amount proportional to the stored radiation energy. The emitted light 15 is guided by a light guide member 16 and photoelectrically detected by a photomultiplier 17 acting as a photodetector.

The light guide member 16 is made of a material exhibiting a high light transmittance, such as an acrylic resin, and has a linear light input face 16a extending along the beam scanning line on the stimulable phosphor sheet 10, and a ring-shaped light output face 16b closely contacted with the light receiving face of the photomultiplier 17. The emitted light 15 entering the light guide member 16 from the light input face 16a is guided through total reflection inside of the light guide member 16 up to the light output face 16b, and received by the photomultiplier 17. Thus the amount of the emitted light 15 carrying the radiation image is detected by the photomultiplier 17. The shape, the material, and the fabrication method suitable for the light guide member 16 are described in detail, for example, in U.S. Pat. No. 4,346,295.

The photomultiplier 17 thus generates an analog output signal (read-out image signal) S, which is forwarded to an operation circuit 18. At this time, the photomultiplier 17 is adjusted to a gain $\alpha$ such that the emitted light 15 at a portion having an average level of energy in the image is converted to a signal level Sm regardless of the X-ray dose. (The gain of the photomultiplier 17 is automatically adjusted based on preliminary read-out as described later.) As mentioned above, the read-out image signal S is in the form wherein the signal component Ss representing the energy level of the scattered radiation 6b is superposed on the signal component Sp representing the energy level of the main transmitted radiation 6a as shown in FIG. 2A, i.e. $S = Sp + Ss$. The operation circuit 18 is connected to a scattered radiation amount predictor 24 for predicting the ratio (scattered radiation ratio) of the amount of scattered radiation to the total amount of radiation emitted to the stimulable phosphor sheet 10 during the image recording by a predicting method as described later, and sending a signal representing the scattered radiation ratio F ($0 \leq F \leq 1$) to the operation circuit 18. The operation circuit 18 receives the signal and multiplies the average signal level Sm, which is adjusted as mentioned above, by $(1-F)$. Since Sm in $(1-F)$. Sm is the average signal level of the image, the formula $Sm = (\overline{Sp} + \overline{Ss})$ holds. On the other hand, since the scattered radiation distribution is assumed to be approximately uniform in the image, the formula $F = \overline{Ss}/(\overline{Sp} + \overline{Ss})$ holds, and therefore $F \cdot Sm = \overline{Ss}$.

Therefore, only the image signal of the main transmitted radiation component is obtained by subtracting F·Sm from the signal in the operation circuit 18.

$$S' = S - F \cdot Sm = (Sp + Ss) - \overline{Ss} = Sp.$$

The image signal Sp thus obtained is sent to an expander 19 which receives the information representing the read-out gain $\alpha$ from the photomultiplier 17 and multiplies the image signal Sp by $\beta/\alpha$ where $\beta$ is a constant for converting it to an image signal S'. The read-out gain $\alpha$ is adjusted based on the image recording conditions, such as the radiation dose as mentioned above. When the signal conversion is thus conducted, it becomes possible to return the signal level, which is generally decreased by elimination of Ss, to the appropriate signal level.

$$Sp \times (\beta/\alpha) = \overline{Sp} + \overline{Ss},$$

and therefore $\beta/\alpha = (\overline{Sp} + \overline{Ss})/\overline{Sp} = 1/(1-F)$.

Since the processing in the expander 19 is conducted on the image signal Sp after the elimination of the signal component Ss caused by the scattered radiation 6b, the image signal of the main transmitted radiation component is greatly amplified, and the contrast is restored.

The image signal S' is then amplified by a logarithmic amplifier 20 and digitized by an A/D converter 21 with a predetermined scale factor to obtain a digital read-out image signal Sd. The digital read-out image signal Sd is sent to an image reproducing apparatus 23 constituted by a CRT, an optical scanning recording apparatus or the like via an image processing device 22, and is used for reproducing the radiation image stored on the stimulable phosphor sheet 10 as a visible image. Since the reproduced visible image is formed based on the image signal Sp, it is free from adverse effects of the scattered radiation 6b and exhibits high contrast.

Prediction of the scattered radiation amount by the scattered radiation amount predictor 24 will hereinbelow be described in detail. The scattered radiation amount predictor 24 comprises a memory 25 for storing the scattered radiation ratios F1, F2, F3, ..., Fn for different image recording portions of the object and image recording conditions, for example, head/simple image recording and abdomen/alimentary canal contrasted image recording, and a read device 26 for receiving information R on the image recording portion of the object and the image recording conditions from, for example, a host computer for controlling the whole radiation image recording and reproducing system. The scattered radiation ratios F1, F2, F3, ..., Fn for different image recording portions of the object and image recording conditions are determined experimentally. For example, it was experimentally found that the scattered radiation ratio at the pelvis is approximately $F = 0.5$ even after passage through a typical grid, and the scattered radiation is distributed approximately uniformly in space. The information R is entered from a terminal device of the radiation image recording section or the like, and the host computer sends the information R on the stimulable phosphor sheet 10 subjected to the image read-out to the read device 26. The read device 26 receives the information R, reads the scattered radiation ratio F for the image recording portion of the object and the image recording conditions represented by the information R from the memory 25, and sends the signal representing the scattered radiation ratio F to the operation circuit 18.

Even when the image recording portion of the object and the image recording conditions are the same, the scattered radiation ratio F may be slightly different among different positions within the image recording portion of the object. In general, in the case of the human body or the like, scattering readily arises at a dense tissue portion and little scattering arises at a portion near the skin. This tendency is remarkable particularly in the case of image recording of the chest where air, bones and soft tissues are present. Accordingly, in the case where image recording is conducted by adjusting the portions of the object to approximately predetermined positions, besides the image recording portion of the object and the image recording conditions, scattered radiation ratios Fij [wherein (i,j) denotes two-dimensional coordinates] determined for different positions inside of the image recording portion (for example, for the head, the two-dimensional coordinates with the center of the head at the origin) may be stored in the memory 25 for respective main scanning lines. The scattered radiation ratios Fij may be read in synchronization with the scanning by stimulating rays, and the processing may be conducted as expressed by S'=S−Fij·Sm in the same manner as described above based on the different Fij values for respective positions inside of the image recording portion.

Figure 3:
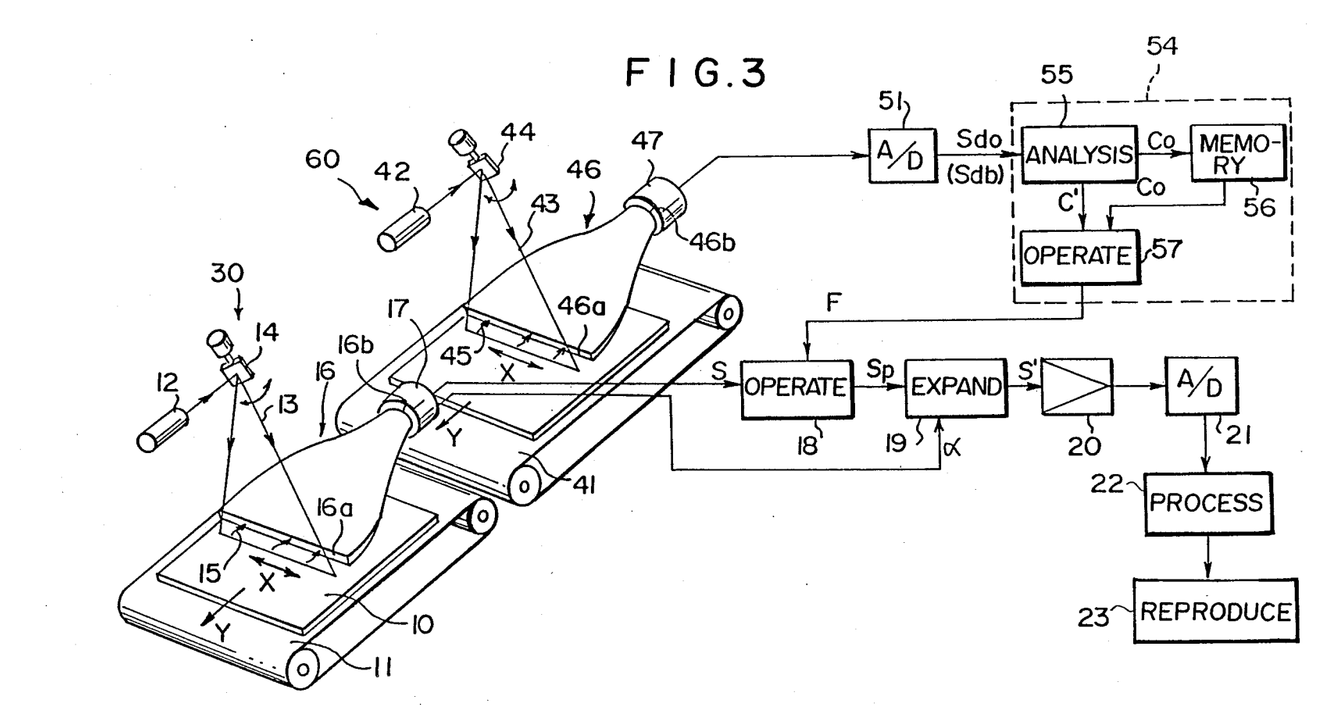
FIG. 3 is a schematic view showing another embodiment of the radiation image read-out apparatus in accordance with the present invention.
Figure 4A:
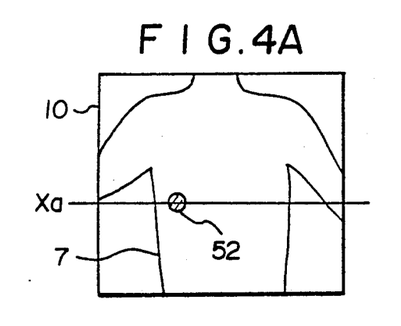
FIGS. 4A and 4B are schematic views showing the condition of radiation image recording on the stimulable phosphor sheet which is subjected to image read-out in the embodiment of FIG. 3, FIGS. 5A and 5B are graphs showing examples of read-out image signals obtained by the embodiment of FIG. 3, FIGS. 6A and 6B are graphs showing examples of histograms of read-out image signals obtained by the embodiment of FIG. 3.

FIG. 3 shows another embodiment of the radiation image read-out apparatus in accordance with the present invention. In FIG. 3, similar elements are numbered with the same reference numerals with respect to FIG. 1 (this also applies to the subsequent drawings). This embodiment is provided with a final read-out section 20 comprising the sheet conveyance means 11, the laser beam source 12, the light deflector 14, the light guide member 16, the photomultiplier 17, the logarithmic amplifier 20, and the A/D converter 21. The embodiment is also provided with a preliminary read-out section 60 comprising a sheet conveyance means 41, a laser beam source 42 for emitting a laser beam 43, a light deflector 44, a light guide member 46 for guiding light 45 emitted by the stimulable phosphor sheet 10, a photomultiplier 47, and an A/D converter 51, like the final read-out section 30. As shown in FIG. 4A, on the stimulable phosphor sheet 10 subjected to the image read-out in this embodiment, a mark 52 is recorded so as to overlap the object image 7 at a position away from the portion of the object 7 which is to be observed. The mark 52 is formed of a material having markedly high radiation absorptivity, such as lead, and is positioned on the object 7 at the time of image recording.

Before radiation image read-out (final read-out) is conducted at the final read-out section 30 for obtaining an image signal for use in reproduction of a visible radiation image, preliminary read-out is conducted on the stimulable phosphor sheet 10 at the preliminary read-out section 60 for approximately ascertaining the image input information on the sheet 10. In the preliminary read-out, the stimulation energy of stimulating rays, i.e. the laser beam 43, is adjusted to be lower than the stimulation energy of stimulating rays, i.e. the laser beam 13, used in the final read-out. The digital preliminary read-out image signal Sdo obtained by the preliminary read-out is sent to a control circuit (not shown), and the read-out gain in the final read-out and/or the scale factor at the A/D converter 21, and/or image processing conditions in the image processing device 22 are adjusted to appropriate values based on the image input information represented by the preliminary read-out image signal Sdo. The preliminary read-out is described in detail in, for example, Japanese Unexamined Patent Publication No. 58(1983)-67240.

Figure 5A:
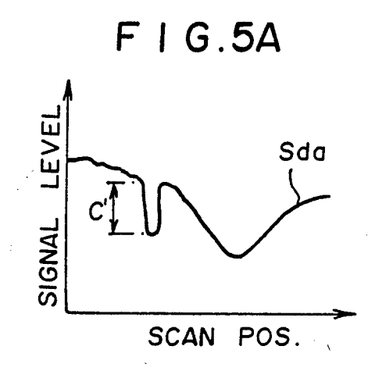

The preliminary read-out image signal Sdo is sent to a scattered radiation amount predictor 54 which comprises a preliminary read-out analysis section 55, a memory 56, and an operation device 57. As shown in FIG. 5A, on the basis of the preliminary read-out image signal Sdo, the preliminary read-out analysis section 55 calculates a level difference C' between the signal representing the mark 52 and the signal representing the portion around the mark 52 in an image signal Sda at a scanning line Sa passing through the portion where the image of the mark 52 is recorded as shown in FIG. 4A.

Figure 4B:
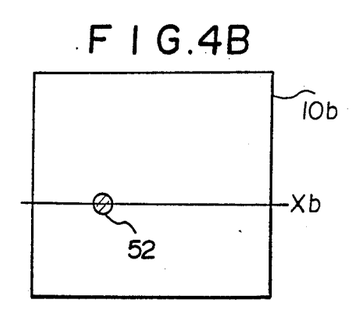
Figure 5B:
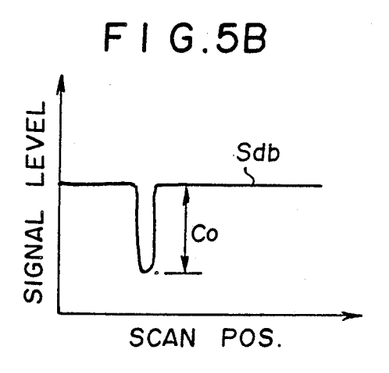

Also as shown in FIG. 4B, before the preliminary read-out is conducted, only the mark 52 is recorded on a stimulable phosphor sheet 10b of the same type as the stimulable phosphor sheet 10. Also for the stimulable phosphor sheet 10b, the image read-out is conducted at the preliminary read-out section 60. In this case, since no image of the object scattering the radiation for image recording is recorded on the stimulable phosphor sheet 10b, the image signal Sdb at the scanning line Xb passing through the portion where the image of the mark 52 is recorded becomes as shown in FIG. 5B. On the basis of the image signal Sdb, the preliminary read-out analysis section 55 calculates the level difference Co as shown in FIG. 5B between the signal representing the portion where the image of the mark 52 is recorded and the signal representing the portion around the mark 52, and stores the information on the level difference Co in the memory 56.

When the preliminary read-out is conducted on the stimulable phosphor sheet 10 and the level difference C' is calculated by the preliminary read-out analysis section 55 as mentioned above, the signal representing the level difference C' is sent to the operation device 57. The operation device 57 receives the signal representing the level difference C' and the signal representing the level difference Co stored in the memory 56, and calculates the formula expressed as $$F = (Co - C')/Co$$

The preliminary read-out image signal Sda is in the form wherein the signal component Ss representing the energy level of the scattered radiation 6b is superposed on the signal component Sp representing the energy level of the main transmitted radiation 6a. On the other hand, the read-out image signal Sdb detected from the stimulable phosphor passing radiation 6a. Namely, the difference (Co−C') between the level differences Co and C' represents the energy level of the scattered radiation 6b, and therefore the value F=(Co−C')/Co represents the scattered radiation ratio described with reference to FIG. 1.

Figure 6A:
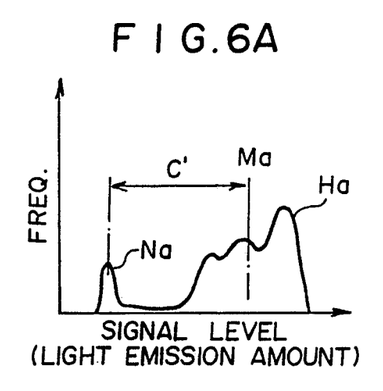
Figure 6B:
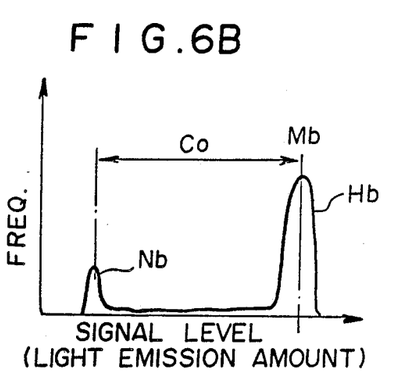

The signal representing the scattered radiation ratio F is sent to the operation circuit 18 as in the embodiment of FIG. 1. The operation circuit 18 subtracts F Sm from the analog read-out image signal S=Sp+Ss obtained by the final read-out. In this manner, the image signal Sp representing the radiation image formed by only the main transmitted radiation 6a is obtained The level differences Co and C' are respectively the differences between the amounts of light emitted by the portion where the image of the mark 52 is recorded and the amounts of light emitted by the portion around the mark 52 on the stimulable phosphor sheets 10 and 10b. In a histogram Ha of the preliminary read-out image signal Sdo detected from the stimulable phosphor sheet 10 as shown in FIG. 6A, the difference between the light emission amounts is the difference C' between a sensitivity center Ma of the signal detected from the object portion and a peak portion Na at the mark 52. In a histogram Hb of the read-out image signal Sdb detected from the stimulable phosphor sheet 10b as shown in FIG. 6B, the difference between the light emission amounts is the difference Co between a sensitivity center Mb of the signal at the background portion and a peak portion Nb at the mark 52. Therefore, the preliminary read-out analysis section 55 may be replaced by a means for creating the histograms Ha and Hb and calculating the differences C' between the sensitivity center Ma and the peak portion Na, and the difference Co between the sensitivity center Mb and the peak portion Nb.

As mentioned above, the scattered radiation ratio F is often different among different portions of the object. Accordingly, the entire image region of each of the stimulable phosphor sheets 10 and 10b may be divided into a plurality of subdivisions in the same manner, the mark 52 may be positioned at the respective subdivisions, and the scattered radiation ratio F may be calculated for the respective subdivisions. In this case, in the operation circuit 18, the aforesaid calculation may be conducted by use of the Fij value inherent to the final read-out image signal S=Sp+Ss at each subdivision.

With the embodiment of FIG. 3, since the scattered radiation ratio F is calculated for each stimulable phosphor sheet 10, it is possible to eliminate the adverse effect of the scattered radiation more accurately than the case where the F value determined experimentally and stored is utilized.

Figure 7:
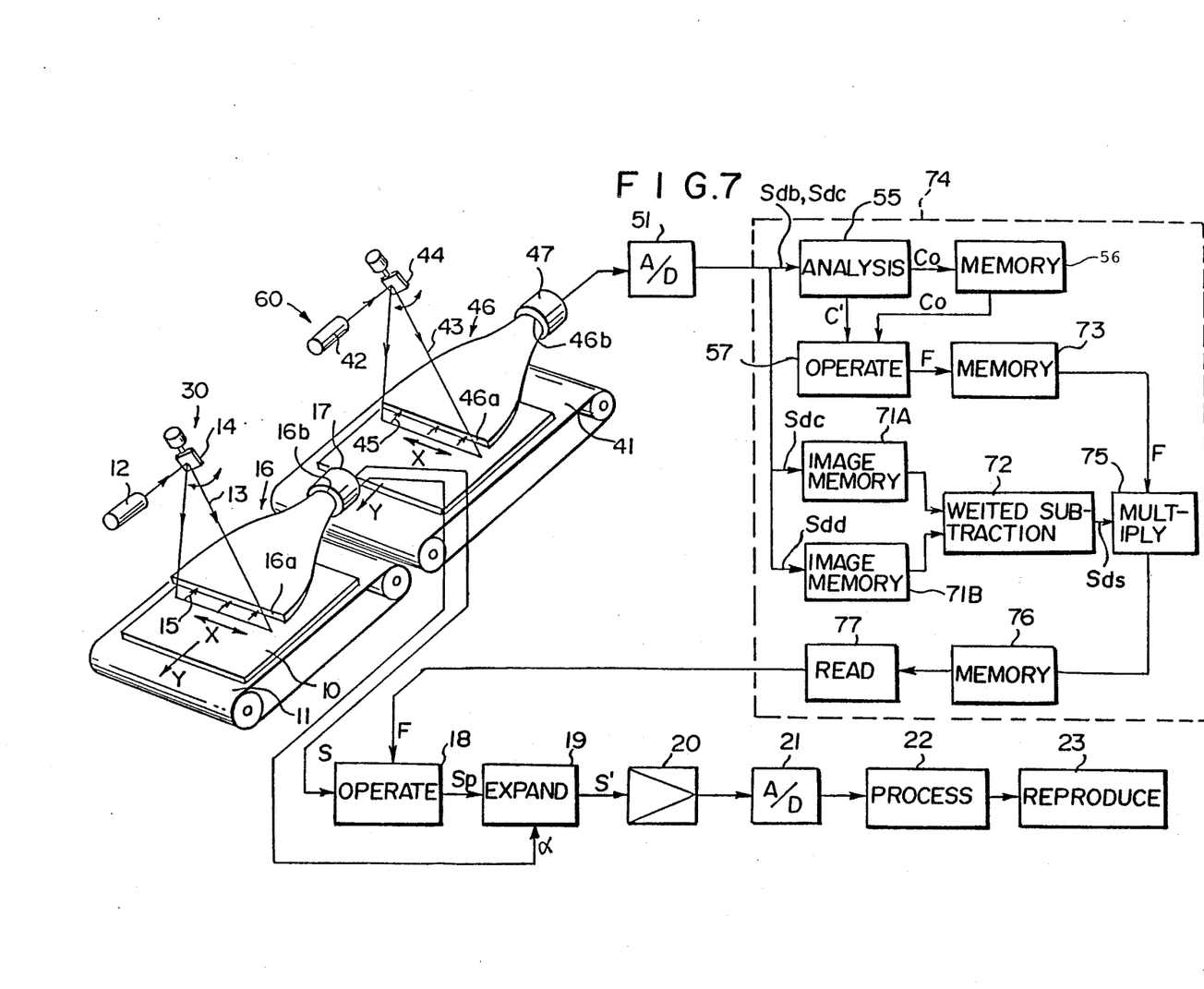
FIG. 7 is a schematic view showing a further embodiment of the radiation image read-out apparatus in accordance with the present invention.
Figure 8:
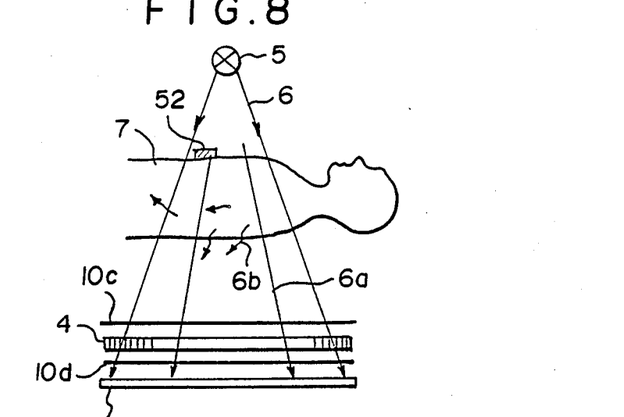
FIG. 8 is a schematic view showing the condition of radiation image recording on the stimulable phosphor sheet which is subjected to image read-out in the embodiment of FIG. 7, FIGS. 9A and 9B are graphs showing examples of read-out image signals obtained by the embodiment of FIG. 7.

FIG. 7 shows a further embodiment of the radiation image read-out apparatus in accordance with the present invention. In this embodiment, image recording of the object 7 is conducted as shown in FIG. 8 on stimulable phosphor sheets 10, 10c and 10d. Specifically, the stimulable phosphor sheet 10c which is comparatively thin (exhibits high radiation transmittance), the grid as mentioned above, the comparatively thin stimulable phosphor sheet 10d, and the stimulable phosphor sheet 10 are positioned in this order from the side closer to the object 7 at the position exposed to the radiation 6 emitted by the radiation source 5 and passing through the object 7. Also, the mark 52 is positioned on the object 7.

Figure 9A:
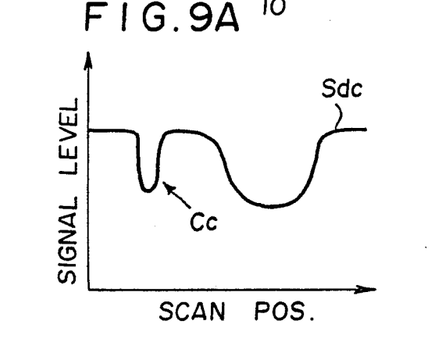
Figure 9B:
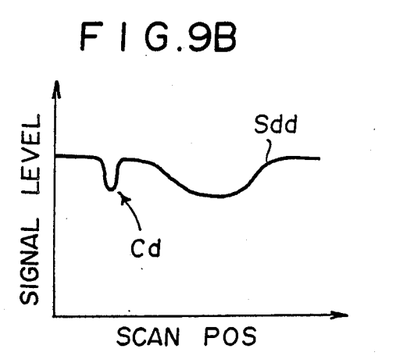
Figure 9C:
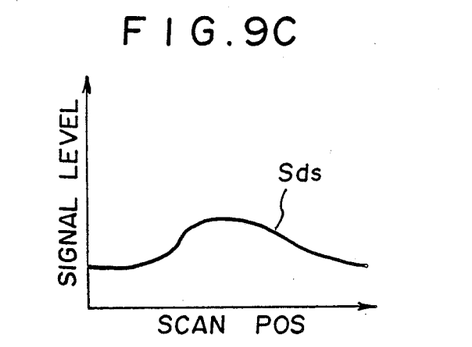
FIG. 9C is a graph showing an example of the signal representing the distribution of scattered radiation, which is obtained by the embodiment of FIG. 7.

After radiation image recording of the object 7 is conducted simultaneously on the stimulable phosphor sheets 10c, 10d and 10, the stimulable phosphor sheet 10c is first subjected to the image read-out at the preliminary read-out section 60 of the embodiment of FIG. 7. Like the embodiment of FIG. 3, the preliminary read-out analysis section 55 of a scattered radiation amount predictor 74 calculates the signal level differences C' and Co by utilizing a read-out image signal Sdc detected from the stimulable phosphor sheet 10c and the read-out image signal Sdb detected from the stimulable phosphor sheet 10b described with reference to FIG. 3. Also, the operation device 57 calculates the scattered radiation ratio F from the values C' and Co. The scattered radiation ratio F is for the portion where the mark 52 is positioned, and is stored in a memory 73. The read-out image signal Sdc (detected from the entire image region) is stored in an image memory 71A constituted by a magnetic disk, an optical disk, a magnetic tape or the like. Then, the stimulable phosphor sheet 10d is sent to the image read-out step at the preliminary read-out section 60, and a read-out image signal Sdd detected from the stimulable phosphor sheet 10d is stored in an image memory 71B of the same type as the image memory 71A. Both the image signal Sdd and the image signal Sdc are in the form wherein the signal component Ss representing the energy level of the scattered radiation 6b is superposed on the signal component Sp representing the energy level of the main transmitted radiation 6a. However, since the grid 4 for absorbing the scattered radiation 6b to some extent is positioned between the stimulable phosphor sheet 10c and the stimulable phosphor sheet 10d, the ratio of the component Sp to the component Ss is different between the image signals Sdc and Sdd. Therefore, for example, when the image signals Sdc and Sdd as shown in FIGS. 9A and 9B are read from the image memories 71A and 71B and weighted subtraction is conducted by a weighted subtraction device 72 so that contrast Cc and contrast Cd of the mark 52 disappear, a signal Sds representing only the energy level of the scattered radiation 6b is obtained as shown in FIG. 9C. The signal Sds represents the distribution condition of the scattered radiation 6b. Accordingly, when the F value read from the memory 73 is multiplied by a value obtained by normalizing the signal Sds in a multiplier 75, the scattered radiation ratio Fij is obtained in the picture element unit over the whole image region. A signal SF representing the thus obtained scattered radiation ratio for every picture element is stored in a memory 76.

When the final read-out is then conducted on the stimulable phosphor sheet 10 at the final read-out section 30, a read device 77 reads the scattered radiation ratio Fij inherent to each picture element from the memory 76 in synchronization with the scanning of the laser beam 13, and sends it to the operation circuit 18. The operation circuit 18 subtracts Fij.Sm from the analog image signal S=Sp+Ss as in the embodiments of FIGS. 1 and 3, and the image signal Sp representing the image formed only with the main transmitted radiation 6a is obtained.

With the embodiment of FIG. 7, since the scattered radiation ratio F is predicted in the picture element unit, it is possible to eliminate the adverse effect of the scattered radiation more accurately than in the embodiment of FIG. 3.

In the embodiments of FIGS. 3 and 7, the final read-out section 30 and the preliminary read-out section are provided independently. However, as described in, for example, Japanese Unexamined Patent Publication No. 58(1983)-67242, a single read-out system may be used for the preliminary read-out and the final read-out. In this case, after the preliminary read-out is finished, the stimulable phosphor sheet is returned to the read-out system by a sheet conveyance means and the final read-out is conducted. In the preliminary read-out step, the energy of stimulating rays is adjusted to be lower than the energy of stimulating rays used in the final read-out. The embodiments of FIGS. 3 and 7 may be modified to provide such a read-out system.

I claim:

1. A radiation image read-out apparatus comprising:
   (i) a stimulating ray emission means for emitting stimulating rays to a stimulable phosphor sheet carrying a radiation image of an object stored thereon by exposure to a radiation passing through said object,
   (ii) a photodetector for photoelectrically detecting light emitted by said stimulable phosphor sheet in proportion to the stored radiation energy when said stimulable phosphor sheet is exposed to said stimulating rays,
   (iii) an amplifier for amplifying a read-out image signal generated by said photodetector,
   (iv) an A/D converter for digitizing an output of said amplifier,
   (v) a scattered radiation amount predictor for predicting a scattered radiation amount stored on said stimulable phosphor sheet,
   (vi) an operation circuit positioned between said amplifier and said photodetector for subtracting a signal component representing said scattered radiation amount from said read-out image signal on the basis of said scattered radiation amount predicted by said scattered radiation amount predictor, and
   (vii) an expander positioned between said operation circuit and said amplifier for adjusting an image signal generated by said operation circuit to a predetermined level.

2. An apparatus as defined in claim 1 wherein said scattered radiation amount predictor comprises a memory for storing scattered radiation ratios for different image recording portions of the object and image recording conditions, and a read device for receiving information on said image recording portions of the object and said image recording conditions and reading said scattered radiation ratios corresponding to said image recording portions of the object and said image recording conditions from said memory.

3. An apparatus as defined in claim 1 wherein said scattered radiation amount predictor comprises a preliminary read-out analysis means for calculating a difference between the amount of light emitted by a mark image storing portion and the amount of light emitted by portion around said mark image storing portion on said stimulable phosphor sheet carrying images of said object and a mark, and said difference on a stimulable phosphor sheet carrying only the image of said mark, a memory for storing said differences, and an operation device for calculating a scattered radiation ratio based on said differences.

4. An apparatus as defined in claim 3 wherein said scattered radiation amount predictor further comprises a means for calculating scattered radiation ratios at respective picture elements in the whole image region on said stimulable phosphor sheet based on said scattered radiation ratio calculated by said operation device and a signal representing the distribution of the scattered radiation amount.

* * * * *